United States Patent
Kerr et al.

(10) Patent No.: US 11,541,992 B2
(45) Date of Patent: Jan. 3, 2023

(54) LANDING GEAR RETRACTION

(71) Applicant: AIRBUS OPERATIONS LIMITED, Bristol (GB)

(72) Inventors: Sean Kerr, Bristol (GB); David Marles, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 382 days.

(21) Appl. No.: 16/799,904

(22) Filed: Feb. 25, 2020

(65) Prior Publication Data
US 2020/0277042 A1   Sep. 3, 2020

(30) Foreign Application Priority Data

Feb. 28, 2019  (GB) ...................................... 1902727

(51) Int. Cl.
*B64C 25/28* (2006.01)
*B64C 25/60* (2006.01)

(52) U.S. Cl.
CPC .............. *B64C 25/28* (2013.01); *B64C 25/60* (2013.01)

(58) Field of Classification Search
CPC ................................ B64C 25/26; B64C 25/28
See application file for complete search history.

(56) References Cited

U.S. PATENT DOCUMENTS

| | | | |
|---|---|---|---|
| 6,854,689 B1 | 2/2005 | Lindahl et al. | |
| 7,093,795 B2 * | 8/2006 | Lindahl | B64C 25/22 |
| | | | 244/102 R |
| 7,475,849 B2 | 1/2009 | Lindahl et al. | |
| 8,070,094 B2 * | 12/2011 | Collins | B64C 25/12 |
| | | | 244/102 SL |
| 9,193,446 B2 * | 11/2015 | Holloway | G01P 1/04 |
| 9,517,837 B2 | 12/2016 | Lecourtier | |
| 9,771,147 B2 * | 9/2017 | Luce | B64C 25/22 |
| 10,112,702 B2 | 10/2018 | Cepic et al. | |

(Continued)

FOREIGN PATENT DOCUMENTS

| | | | |
|---|---|---|---|
| CN | 104309799 A | * | 1/2015 |
| CN | 104648660 A | * | 5/2015 |

(Continued)

OTHER PUBLICATIONS

Combined Search and Examination Report for GB Application No. 1902727.5 dated Aug. 14, 2019, 7 pages.

(Continued)

*Primary Examiner* — Joseph W Sanderson
(74) *Attorney, Agent, or Firm* — Nixon & Vanderhye P.C.

(57) ABSTRACT

A landing gear system 100 for an aircraft including: a landing gear 130 that is movable between an extended position and a retracted position, the landing gear includes an extendible strut 136; a position sensor 140 configured to detect a position of a part of the extendible strut and output a signal indicative of the position; and a landing gear controller 150 that is communicably connected to the position sensor and is configured, in use, to: receive the signal from the position sensor; and, on the basis of the signal, determine that the strut has extended and the landing gear is in contact with the ground and automatically cause performance of at least a portion of a procedure to move the landing gear from the extended position to the retracted position.

19 Claims, 2 Drawing Sheets

(56) References Cited

U.S. PATENT DOCUMENTS

| | | | | |
|---|---|---|---|---|
| 11,299,261 B2* | 4/2022 | Kerr | ......................... | B64C 25/30 |
| 2006/0027706 A1* | 2/2006 | Lindahl | .................... | B64C 25/28 |
| | | | | 244/102 R |
| 2008/0308672 A1* | 12/2008 | Lindahl | .................... | B64C 25/22 |
| | | | | 244/102 A |
| 2010/0012779 A1* | 1/2010 | Collins | .................... | B64C 25/24 |
| | | | | 244/102 R |
| 2015/0102163 A1* | 4/2015 | Luce | ........................ | B64C 25/22 |
| | | | | 91/418 |
| 2015/0367933 A1 | 12/2015 | Li et al. | | |
| 2018/0362151 A1 | 12/2018 | Marles | | |
| 2020/0055592 A1* | 2/2020 | Rowlands | ................ | B64C 25/16 |
| 2020/0277043 A1* | 9/2020 | Kerr | ......................... | B64C 25/26 |
| 2020/0277044 A1* | 9/2020 | Kerr | ......................... | B64C 25/28 |
| 2020/0407047 A1* | 12/2020 | Kerr | .......................... | B64C 9/00 |

FOREIGN PATENT DOCUMENTS

| | | |
|---|---|---|
| EP | 1718525 | 11/2006 |
| EP | 2860104 | 4/2015 |
| EP | 3 415 419 | 12/2018 |
| WO | 2005/077757 | 8/2005 |

OTHER PUBLICATIONS

European Search Report cited in EP 20159482.7 dated Jul. 21, 2020, 9 pages.

* cited by examiner

LANDING GEAR RETRACTION

RELATED APPLICATION

This application claims priority to United Kingdom Patent Application GB 1902727.5 filed Feb. 28, 2019, the entirety of which is incorporated by reference.

TECHNICAL FIELD

The present invention relates to retraction of aircraft landing gear, and particularly to landing gear systems, methods of controlling a landing gear system of an aircraft using a landing gear controller of the aircraft, and aircraft.

BACKGROUND

In some known aircraft, a landing gear is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed, and may be openable to enable movement of the landing gear between the retracted position and the extended position. Movement of the landing gear and the landing gear bay door is typically controlled by a pilot using cockpit flight controls of the aircraft, such as a landing gear control lever.

SUMMARY

A first aspect of the present invention provides a landing gear system for an aircraft, the landing gear system comprising: a landing gear that is movable between an extended position and a retracted position, the landing gear comprising an extendible strut; a position sensor configured to detect a position of a part of the extendible strut and output a signal indicative of the position; and a landing gear controller that is communicably connected to the position sensor and is configured, in use, to: receive the signal from the position sensor; and, on the basis of the signal, determine that the strut has extended and the landing gear is in contact with the ground and automatically cause performance of at least a portion of a procedure to move the landing gear from the extended position to the retracted position.

Optionally, the extendible strut is a telescopically-extendible strut.

Optionally, the landing gear controller is configured, in use, to determine that the strut has extended and the landing gear is in contact with the ground and automatically cause the performance, on the basis of a combination of the signal and at least one further criterion.

Optionally, the at least one further criterion comprises the signal having been received at the landing gear controller for greater than a predetermined time period.

Optionally, the predetermined time period is up to half a second, or less than one second. Optionally, the predetermined time period is less than two seconds.

Optionally, the at least one further criterion comprises a pitch angle of a bogie of the landing gear.

Optionally, the position sensor is configured to directly detect the position of the part of the extendible strut.

Optionally, the position sensor is configured to detect the position of the part of the extendible strut when the extendible strut has a predetermined length that is less than a maximum length to which the strut is extendible.

Optionally, the predetermined length is at least 50% of the maximum length; optionally the predetermined length is at least 75% of the maximum length; further optionally the predetermined length is at least 95% of the maximum length.

Optionally, the position sensor is configured to detect the position of the part of the extendible strut when the extendible strut has a predetermined length that is substantially equal to a maximum length to which the strut is extendible.

Optionally, the landing gear system comprises an isolator for isolating part of the landing gear system from a power supply, and the portion of the procedure comprises operation of the isolator to enable power to be supplied to the part of the landing gear system.

Optionally, the portion of the procedure comprises one or more avionics processes and/or one or more mechanical processes.

Optionally, the landing gear system comprises one or more landing gear bay door locks to retain the landing gear bay door in the closed position when the landing gear bay door lock is locked, and the portion of the procedure comprises unlocking the, or each, landing gear bay door lock to permit movement of the landing gear bay door to the open position.

Optionally, the portion of the procedure comprises actuating the one or more landing gear bay door actuators to move the landing gear bay door further from the open position before the unlocking of the, or each, landing gear bay door lock, thereby to facilitate unlocking of the, or each, landing gear bay door lock.

Optionally, the landing gear system comprises one or more landing gear bay door actuators configured to move a landing gear bay door from a closed position towards an open position to permit movement of the landing gear between the extended position and the retracted position; and the portion of the procedure comprises the one or more landing gear bay door actuators moving the landing gear bay door from the closed position towards the open position.

Optionally, the landing gear system comprises one or more landing gear actuators configured to move the landing gear from the extended position towards the retracted position; and the portion of the procedure comprises the one or more landing gear actuators moving the landing gear from the extended position towards the retracted position.

Optionally, the landing gear controller is configured, in use, to: receive an input indicative of an event; and automatically cause performance of a preliminary portion of the procedure on the basis of the input, before causing the performance of the portion of the procedure.

Optionally, the input is indicative of at least one of: braking force being less than a predetermined braking force, thrust being greater than a predetermined thrust, aircraft groundspeed being greater than a predetermined groundspeed, change in length of the extendible strut, a command from a cockpit flight control, and aircraft geographical position (e.g. on a runway).

Optionally, the input is indicative of a command from a landing gear control lever.

Optionally, the preliminary portion of the procedure comprises one or more avionics processes and/or one or more mechanical processes.

Optionally, the preliminary portion of the procedure comprises an avionics side change over.

Optionally, the landing gear system comprises one or more landing gear bay door locks to retain the landing gear bay door in the closed position when the landing gear bay door lock is locked; and the preliminary portion of the procedure comprises unlocking the, or each, landing gear bay door lock to permit movement of the landing gear bay door to the open position.

Optionally, the preliminary portion of the procedure comprises actuating one or more landing gear bay door actuators to move the landing gear bay door further from the open position before the unlocking of the, or each, landing gear bay door lock, thereby to facilitate unlocking of the, or each, landing gear bay door lock.

Optionally, the landing gear system comprises an isolator for isolating part of the landing gear system from a power supply; and the preliminary portion of the procedure comprises operation of the isolator to enable power to be supplied to the part of the landing gear system.

Optionally, the strut is or comprises a shock absorber for supporting the aircraft when the aircraft is on the ground, and the part of the extendible strut is a part of the shock absorber.

A second aspect of the present invention provides a method of controlling a landing gear system of an aircraft using a landing gear controller of the aircraft, the method comprising the landing gear controller: receiving a signal from a position sensor, wherein the signal is indicative of a position of a part of an extendible strut of a landing gear, wherein the landing gear is movable between an extended position and a retracted position, and wherein the receiving occurs when the aircraft, or the landing gear, is in contact with the ground; and automatically causing performance of at least a portion of a procedure for causing movement of the landing gear from the extended position to the retracted position, on the basis of the signal.

Optionally, the landing gear controller automatically causes the performance only when the landing gear controller has determined that the signal has been received at the landing gear controller for greater than the predetermined time period, such as up to half a second, less than one second or less than two seconds.

A third aspect of the present invention provides a non-transitory computer-readable storage medium storing instructions that, if executed by a processor of a landing gear controller of an aircraft, cause the processor to carry out the method according to the second aspect of the present invention.

A fourth aspect of the present invention provides a landing gear system for an aircraft, the landing gear system comprising a landing gear controller that is configured to carry out the method according to the second aspect of the present invention.

A fifth aspect of the present invention provides a landing gear system for an aircraft, the landing gear system comprising: a retractable landing gear having a shock absorber that is configured to support the aircraft when the aircraft is on the ground; a sensor configured to directly detect a characteristic of the shock absorber and output an indication of the characteristic; and a landing gear controller that is communicably connected to the sensor and is configured, in use, to receive the indication and, on the basis of the indication, to automatically cause performance of at least a portion of a procedure for retracting the landing gear.

Optionally, the landing gear system comprises one or more landing gear bay door actuators configured to move a landing gear bay door from a closed position towards an open position to permit retraction of the landing gear. Further optionally, the portion of the procedure comprises the one or more landing gear bay door actuators moving the landing gear bay door from the closed position towards the open position on the basis of the signal.

Optionally, the landing gear controller is configured, in use, to automatically cause the performance only when the landing gear controller has determined that the signal has been received at the landing gear controller for greater than the predetermined time period.

Optionally, the predetermined time period is up to half a second, or less than one second. Optionally, the predetermined time period is less than two seconds.

Optionally, the characteristic of the shock absorber is a degree of travel of the shock absorber.

A sixth aspect of the present invention provides an aircraft comprising the landing gear system according to the first, fourth or fifth aspect of the present invention, or the non-transitory computer-readable storage medium according to the third aspect of the present invention.

BRIEF DESCRIPTION OF THE DRAWINGS

Embodiments of the invention will now be described, by way of example only, with reference to the accompanying drawings, in which.

DETAILED DESCRIPTION

Landing gear can influence aircraft performance. In the extended position, the landing gear may increase aircraft drag, which can reduce the climb rate of the aircraft during take-off, and may increase aircraft noise, which can be disturbing to people on the ground in the vicinity of the aircraft. Similar effects can result from a landing gear bay door being in an open position.

Often, actuation of each landing gear (and associated landing gear bay door, when provided) of an aircraft during a take-off procedure is initiated by a pilot manually operating cockpit flight controls, such as a landing gear control lever. Typically, operation of the cockpit flight controls causes one or more landing gear bay door actuators to drive movement of the landing gear bay door from a closed position to an open position, one or more landing gear actuators to retract the landing gear, and then the one or more landing gear bay door actuators to drive movement of the landing gear bay door from the open position to the closed position. During a take-off procedure, the pilot will typically manually initiate a landing gear retraction procedure upon confirming a positive rate of aircraft climb. Such confirmation may occur at about three seconds after take-off. Since the take-off procedure is one of the highest workload flight phases for flight crew, there is a tendency for retraction of landing gear to be delayed after take-off, in order to spread the various actions that the flight crew must perform during take-off over a greater period of time.

Some examples discussed herein are concerned with enabling landing gear retraction to occur sooner after take-off, in particular since this could help to reduce aircraft drag. In turn, this may enable an increased aircraft climb rate to help avoid obstacles on the ground and/or may allow an increase in maximum take-off weight of the aircraft for a given size of landing gear system, wing capability and engine thrust. Similarly, enabling landing gear retraction to occur sooner in a take-off procedure can help to reduce the total aircraft noise caused during a take-off procedure, or at least reduce a period of time during which the aircraft is making increased noise due to extended landing gear. Decreasing the time for which the landing gear is extended and the landing gear bay door is open can also reduce the risk of the landing gear or the landing gear bay door being damaged, such as by buffeting by wind.

Figure 1:
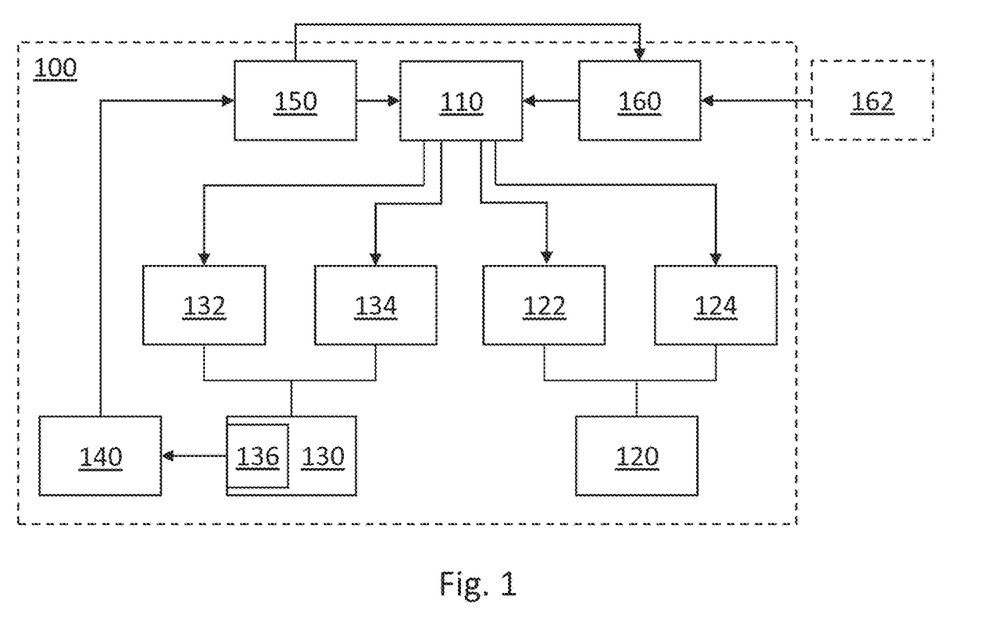
FIG. 1 is a schematic view of an example of a landing gear system.

FIG. 1 shows a schematic view of an example of an aircraft landing gear system. The landing gear system 100 comprises a landing gear extension and retraction system 110 and a landing gear controller 150 that is communicably connected to the landing gear extension and retraction system 110. The landing gear system 100 also comprises a landing gear bay door 120 that is movable from a closed position towards an open position, one or more landing gear bay door actuators 122, one or more landing gear bay door locks 124, a landing gear 130 that is movable from an extended position to a retracted position, one or more landing gear actuators 132, one or more landing gear locks 134, a position sensor 140, and an isolator 160. These and other elements will be described in more detail below.

In this example, the landing gear controller 150 is configured to control the landing gear extension and retraction system 110. That is, the landing gear controller 150 is to cause the landing gear extension and retraction system 110 to cause the elements 120-134 to perform certain actions. In other examples, the landing gear controller 150 may be comprised in the landing gear extension and retraction system 110, so that the landing gear controller 150 may be configured to cause the elements 120-134 to perform those certain actions.

The landing gear bay door 120 is associated with a landing gear bay (not shown). The landing gear bay door 120 at least partially covers the landing gear bay when in the closed position. The landing gear 130 is at least partially positioned in the landing gear bay when in the retracted position. This way, the landing gear bay door 120 helps to protect the landing gear bay, and the landing gear 130 when stowed in the bay, from debris that might be thrown towards the bay while the aircraft is moving on the ground or in flight. Moreover, the landing gear bay door 120 helps to reduce drag (i.e. create an aerodynamically-cleaner aircraft).

The one or more landing gear bay door actuators 122 are for moving the landing gear bay door 120 from the closed position towards the open position, to permit movement of the landing gear 130 between the extended position and the retracted position. Each of the one or more landing gear bay door actuators 122 may take any suitable form, such as a hydraulic actuator, an electro-hydraulic actuator, or an electric actuator. The one or more landing gear bay door actuators 122 may also be for moving the landing gear bay door 120 from the open position towards the closed position, or an alternative mechanism may be provided for such closure.

The one or more landing gear bay door locks 124 are for locking the landing gear bay door 120 in the closed position when the landing gear bay door lock(s) 124 are locked. Each of the one or more landing gear bay door locks 124 may take any suitable form, such as a hydraulically-actuated lock, an electro-hydraulically-actuated lock, an electrically-actuated lock, or a mechanically-actuated lock. In some cases, the one or more landing gear bay door locks 124 may be omitted. For example, the landing gear bay door 120 may be held in the closed position by the one or more landing gear bay door actuators 122 or by a mechanical linkage (such as a re-erecting lock stay).

The one or more landing gear actuators 132 are for moving the landing gear 130 from the extended position towards the retracted position. Each of the one or more landing gear actuators 132 may take any suitable form, such as a hydraulic actuator, an electro-hydraulic actuator, or an electric actuator. The one or more landing gear actuators 132 may also be for moving the landing gear 130 from the retracted position towards the extended position, or an alternative mechanism may be provided for extension.

The one or more landing gear locks 134 are for locking the landing gear 130 in the retracted position when the landing gear lock(s) 134 are locked. Each of the one or more landing gear locks 134 may take any suitable form, such as a hydraulically-actuated lock, an electro-hydraulically-actuated lock, an electrically-actuated lock, or a mechanically-actuated lock. In some cases, the one or more landing gear locks 134 may be omitted. For example, the landing gear 130 may be held in the retracted position by the one or more landing gear actuators 132 or by a mechanical linkage (such as a re-erecting lock stay).

The landing gear 130 comprises an extendible strut 136. The extendible strut 136 may be a telescopically-extendible strut 136. The strut 136 may be, or comprise, a shock absorber 136 for supporting the aircraft when the aircraft is on the ground in normal use. The shock absorber 136 may absorb shock loads during aircraft landing. For example, the shock absorber 136 may be a pneumatic air-oil hydraulic shock absorber. Some such struts are known as oleo struts or oleo-pneumatic struts. Example such struts will be known to the skilled person, and so further detail of the strut 136 will not be given herein in the interests of brevity.

The landing gear controller 150 is operably connected to the isolator 160. The isolator 160 is for isolating part of the landing gear system 100 from a power supply 162. In particular, the isolator 160 is for isolating the landing gear extension and retraction system 110 from the power supply 162, in this example. In this example, the isolator 160 is an isolation valve 160. In this example, the landing gear extension and retraction system 110 is a hydraulic system and the power supply 162 is a supply of hydraulic power. The supply of hydraulic power may be a centralised aircraft hydraulic system. The isolation valve 160 isolates the landing gear extension and retraction system 110 from the supply of hydraulic power when the isolation valve 160 is in a closed position. The isolation valve 160 permits the flow of hydraulic fluid from the supply of hydraulic power 162 to the landing gear extension and retraction system 110 when the isolation valve is in an open position. In other examples, the landing gear extension and retraction system 110 may be an electric or electro-mechanical system and the isolator 160 may be an electrical switch or other appropriate device configured to control the supply of electric power from a power supply to the landing gear extension and retraction system 110. In some cases, the isolator 160 may be omitted. For instance, the landing gear extension and retraction system 110 may be permanently connected to the power supply 162.

The position sensor 140 is configured to detect a position of a part of the extendible strut 136 and to output a signal indicative of the position. When the strut 136 is, or comprises, a shock absorber 136, the part of the extendible strut 136 may be a part of the shock absorber 136. For example, the part could be part of a telescopic assembly. Moreover, when the strut 136 is, or comprises, a shock absorber 136, the sensor may be configured to detect a characteristic of the shock absorber 136, such as a length or volume of the shock absorber 136, and the signal may be an indication of the characteristic.

The position sensor 140 may detect the position of the part of the strut 136 in one of several ways. For example, the strut 136 may comprise first and second relatively-movable parts, such as first and second telescopically-movable parts, and the position sensor 140 may be mounted on one of the parts and be configured to sense a distance to a target or the other of the parts. For example, the position sensor 140 may be mounted on the part in question. Alternatively, the position sensor 140 may be mounted separately from the strut 136, and be configured to sense the position of the part of the strut 136 relative to the position sensor 140. For example, the position sensor 140 may comprise a transmitter of electromagnetic radiation and a receiver, and the position sensor 140 may detect the position of the part of the strut 136 when the part of the strut 136 interrupts, or clears, a path between the transmitter and the receiver. The position sensor 140 may comprise a transmitter of electromagnetic radiation and a receiver that are mounted on separate supports, wherein the supports are arranged such that extension or retraction of the strut 136 brings the transmitter and receiver into alignment. Other arrangements may be used in other examples. For example, while a number of sensor arrangements for directly detecting the position of the part of the strut 136 have been mentioned, in other examples the position or angle of another component (such as part of a torque link of the landing gear 130) may be sensed and indicative of a position of part of the strut 136, so that the position of the part of the strut 136 is detected indirectly.

As an aircraft with landing gear including an extendible strut 136 (e.g. a shock absorber) approaches a state where it is about to leave contact with the ground during a take-off procedure, the strut 136 partially or fully extends from a baseline fully- or partially-compressed state as a result of lift being created by the wings. Due to the architecture of a typical shock absorber, there is often a minimum load required to be applied to the shock absorber before the shock absorber begins to compress. This is sometimes called the "breakout" load. Therefore, even when the shock absorber is fully extended, it is still able to support a load without being compressed. As such, even when a shock absorber is fully extended during a take-off procedure, a point will be reached when the aircraft is nearly flying, the shock absorber is at or close to being fully extended, and yet there is still contact between the landing gear and the ground.

With suitable configuration of the position sensor 140, the position sensor 140 may thus be able to sense when the part of the extendible strut 136 is in a position indicative of the strut 136 being of the length the strut 136 would adopt when the aircraft is about to leave contact with the ground. Therefore, the position sensor 140 may be configured to output the signal, and the landing gear controller 150 may be configured to receive the signal, when the landing gear 130 is in contact with the ground.

The position sensor 140 may be configured and arranged (e.g. suitably located) to detect the position of the part of the extendible strut 136 when the extendible strut 136 has a predetermined length that is less than a maximum length to which the strut 136 is extendible in normal use. For example, the predetermined length may be at least 25% of the maximum length, at least 33% of the maximum length, at least 50% of the maximum length, at least 75% of the maximum length, at least 90% of the maximum length, or at least 95% of the maximum length. Alternatively, the position sensor 140 may be configured and arranged (e.g. suitably located) to detect the position of the part of the extendible strut 136 when the extendible strut 136 has a predetermined length that is equal, or substantially equal, to a maximum length to which the strut 136 is extendible in normal use.

The position sensor 140 may, for example, be an absolute position sensor or a relative position sensor. The position sensor 140 may, for example, be a linear position sensor, an angular position sensor, or a multi-axis position sensor. Example position sensors that could be used include: Linear Variable Differential Transformers (LVDTs), Rotary Variable Differential Transformers (RVDTs), proximity sensors, optical sensors, microswitches, and load sensors. Other types of sensor may be used in other examples.

The position sensor 140 may be configured to output the signal indicative of the position of the part of the strut 136 when the position sensor 140 senses the part, or the absence of the part. Alternatively, the position sensor 140 may be configured to output the signal indicative of the position of the part of the strut 136 when the position sensor 140 senses movement of the part. Alternatively, the position sensor 140 may be configured to output the signal indicative of the position of the part of the strut 136 constantly. As a still further alternative, the position sensor 140 may be configured to output the signal indicative of the position of the part of the strut 136 periodically, such as once every second, or once every half second, or once every 100 milliseconds, or once every 50 milliseconds, for example. Other frequencies may of course be employed.

Typically, a procedure for causing movement of a landing gear of a landing gear system from an extended position to a retracted position may comprise the following actions (although it is to be noted that some of the actions, such as (a) and/or (b), may not be present in some procedures):
  (a) operating an isolator to enable power to be supplied to part of the landing gear system;
  (b) actuating one or more landing gear bay door actuators to move a landing gear bay door further from the open position, thereby to facilitate subsequent unlocking of at least one landing gear bay door lock;
  (c) unlocking the at least one landing gear bay door lock;
  (d) actuating the one or more landing gear bay door actuators to move the landing gear bay door from the closed position towards the open position;
  (e) actuating one or more landing gear actuators to move the landing gear from the extended position towards the retracted position; and
  (f) actuating the one or more landing gear bay door actuators to move the landing gear bay door from the open position towards the closed position.

The landing gear controller 150 is communicably connected to the position sensor 140 and is configured, in use, to receive the signal from the position sensor 140. The signal may, for example, be an electrical or electronic signal. Alternatively, it may be a mechanical or fluid signal, such as a hydraulic or pneumatic signal. The landing gear controller 150 is configured, in use, and on the basis of the signal, to determine that the strut 136 has extended and the landing gear 130 is in contact with the ground and automatically cause performance of at least a portion of a landing gear retraction procedure.

The portion of the procedure may comprise operation of the isolator 160 to enable power to be supplied to the part of the landing gear system 100.

The portion of the procedure may comprise one or more avionics processes and/or one or more mechanical processes. The avionics may function to check on the state of one or more components of the landing gear system 100. The avionics may be configured to control one or more components of the landing gear system 100.

The portion of the procedure may comprise unlocking the, or each, landing gear bay door lock 124 to permit movement of the landing gear bay door 120 to the open position. The portion of the procedure may comprise actuating the one or more landing gear bay door actuators 122 to move the landing gear bay door 120 further from the open position before the unlocking of the, or each, landing gear bay door lock 124, thereby to reduce the load on the lock(s) 124 and thus facilitate unlocking of the, or each, landing gear bay door lock 124.

In some cases, the portion of the procedure may exclude actuation of the one or more landing gear bay door actuators 122 and the one or more landing gear actuators 132. Therefore, actuation of these actuators 122, 132 may remain under the control of the flight crew, so that the flight crew retain authority for causing actual opening of the landing gear bay door and the actual extension of the landing gear. Nevertheless, the landing gear controller 150 causing performance of these other actions reduces the time required to subsequently retract the landing gear when the flight crew command the retraction. This can lead to one or more of the advantages discussed above. This may be particularly the case when these other actions involve avionics, because functions involving avionics can cause latency. For instance, hydraulic or electrical valves or switches take time to respond to avionic signals.

Movement of a landing gear bay door from a closed position to an open position typically takes in the order of three seconds. Moreover, as mentioned above, during a take-off procedure, the pilot will conventionally initiate a landing gear retraction procedure only upon confirming a positive rate of aircraft climb, and such confirmation may occur at about three seconds after take-off. Therefore, conventionally, about six or more seconds elapse after take-off before the landing gear begins to be retracted.

In some cases, therefore, the portion of the procedure may comprise the one or more landing gear bay door actuators 122 moving the landing gear bay door 120 from the closed position towards the open position. Again, actuation of the one or more landing gear actuators 132 may remain under the control of the flight crew, but the landing gear controller 150 causing automatic opening of the landing gear bay door 120 still further reduces the time required to subsequently retract the landing gear when the flight crew commands the retraction. As such, some of the systems described herein enable movement of the landing gear bay door 120 from the closed position towards the open position to be initiated sooner, such as before take-off, on take-off, or immediately after take-off. Therefore, subsequent movement of the landing gear 130 from the extended position towards the retracted position may also be initiated sooner after take-off, for example in the order of three seconds sooner. This helps to provide the benefits of drag and noise reduction described above.

In still further cases, the portion of the procedure may comprise the one or more landing gear actuators 132 moving the landing gear 130 from the extended position towards the retracted position, although this should only be performed when it is known that the aircraft is off the ground. Such an airborne state may be determined by the landing gear controller 150 by any method known in the art, such as through the use of sensors for sensing landing gear wheel speed or load, sensors for sensing height of the aircraft above the ground (such as radio altimeters), or other suitable sensors that will be apparent to the skilled reader.

The portion of the procedure may further comprise the one or more landing gear bay door actuators 122 subsequently moving the landing gear bay door 120 from the open position towards the closed position. Accordingly, in some cases, there may be no need for the flight crew to instigate performance of any portion of the procedure. It will be appreciated that this may advantageously reduce their workload during the take-off procedure.

In some examples, the landing gear controller 150 is configured to determine that the strut 136 has extended, yet the landing gear 130 is still in contact with the ground, on the basis of the signal from the position sensor 140 alone. For example, the position sensor 140 may be configured to sense when the part of the extendible strut 136 has reached a position indicative of the strut 136 being of a length at which the landing gear 130 is about to leave contact with the ground. That is, the part of the extendible strut 136 may only reach that position in normal use when the landing gear 130 is still on the ground but is about to leave the ground. Alternatively, or additionally, the position sensor 140 may be configured to sense when the part of the extendible strut 136 has reached the position at a certain rate of movement that indicates that the landing gear 130 is about to leave the ground.

In some circumstances, the landing gear controller 150 may be configured, in use, to determine that the strut 136 has extended and the landing gear 130 is in contact with the ground and automatically cause the performance of at least the portion of the procedure, on the basis of a combination of the signal from the position sensor 140 and at least one further criterion.

The at least one further criterion may comprise the signal having been received at the landing gear controller 150 for greater than a predetermined time period. The predetermined time period may, by way of example only, be up to half a second, less than one second or less than two seconds. A different predetermined time period may be used in another example. However, the predetermined time period is preferably selected so as to be long enough that very short periods of strut extension do not result in the landing gear controller 150 causing retraction of the landing gear 130. This may be useful when, for example, the aircraft is rolling along uneven ground such that the length of the strut 136 may increase temporarily and then shorten again quickly thereafter. In such circumstances, the landing gear 130 may leave, or be about to leave, contact with the ground, but the landing gear 130 and the aircraft are not to become airborne to the extent that landing gear 130 retraction is appropriate.

Additionally, or alternatively, the at least one further criterion may comprise a pitch angle of a bogie of the landing gear 130. When the landing gear 130 (such as a main landing gear) has a bogie upon which the wheels are rotationally mounted, then bogie rotation can be monitored. This may be used to detect whether the landing gear 130 is traversing bumpy ground (such that the bogie angle fluctuates frequently) or whether the aircraft is rotating steadily ready for take-off (such that the bogie angle changes smoothly). The landing gear system 100 may comprise a bogie angle sensor (not shown) that is configured to detect an angle of the bogie and output a signal indicative of the angle, and the landing gear controller 150 may be communicably connected to the bogie angle sensor and be configured, in use, to receive the signal from the bogie angle sensor. The landing gear controller 150 may determine that the strut 136 has extended and the landing gear 130 is in contact with the ground and automatically cause the performance, on the basis of the signal from the position sensor 140 and the signal from the bogie angle sensor.

One or more other criteria may be considered in other examples.

In some cases, the landing gear controller 150 is configured, in use, to receive an input indicative of an event, and automatically cause performance of a preliminary portion of the landing gear retraction procedure on the basis of the input, before causing the performance of the portion of the landing gear retraction procedure. The input may, for example, be an electrical or electronic signal. Alternatively, it may be a mechanical or fluid signal, such as a hydraulic or pneumatic signal. Therefore, in some cases, the landing gear controller 150 may cause performance of some of the procedure before the landing gear controller 150 receives the signal from the position sensor 140.

The event may, for example, be the commencement of a take-off run. At such a time, the aircraft may have a certain geographical position, a command may be given from the cockpit flight control, brakes of the aircraft may be released, engine thrust (whether by a jet engine, electric engine, or a different form of engine) may be increased, the groundspeed of the aircraft would increase, and the extendible strut 136 may even change in length as the aircraft experiences load transfer. Accordingly, the input may, for example, be indicative of at least one of: the aircraft's geographical position, braking force being less than a predetermined braking force, thrust being greater than a predetermined thrust, aircraft groundspeed being greater than a predetermined groundspeed, change in length of the extendible strut, and a command from a cockpit flight control (such as a landing gear control lever, a different type of user-movable device, a touchpad, a touchscreen, a gesture-operable device, a voice-operable device, or any combination thereof).

The preliminary portion of the procedure may comprise operation of the isolator 160 to enable power to be supplied to the part of the landing gear system 100.

The preliminary portion of the procedure may comprise one or more avionics processes and/or one or more mechanical processes. Aircraft sometimes have first and second substantially identical avionics systems for redundancy purposes. The preliminary portion of the procedure may comprise an avionics side change over, during which the avionics system enabled for a take-off procedure is switched from one of the available systems to the other. This avoids either avionics system being dormant for a prolonged period, which in turn helps to keep each system well exercised and enables sooner identification of any faults.

The preliminary portion of the procedure may comprise unlocking the, or each, landing gear bay door lock 124 to permit movement of the landing gear bay door 120 to the open position. The preliminary portion of the procedure may comprise actuating the one or more landing gear bay door actuators 122 to move the landing gear bay door 120 further from the open position before the unlocking of the, or each, landing gear bay door lock 124, thereby to reduce the load on the lock(s) 124 and thus facilitate unlocking of the, or each, landing gear bay door lock 124. The preliminary portion of the procedure may even comprise actuating the one or more landing gear bay door actuators 122 to move the landing gear bay door 120 from the closed position towards the open position. If the actuation system is capable, such opening of the landing gear bay door 120 while the aircraft accelerates along the runway is preferably very slow, so as to better ensure that the landing gear bay door is acting to protect the landing gear bay from debris that might be thrown towards the bay and to reduce drag.

It will be appreciated that such event-triggered performance of the preliminary portion of the landing gear retraction procedure may still further lessen the time subsequently required to perform the portion of the procedure on the basis of the signal from the position sensor 140.

Figure 2:
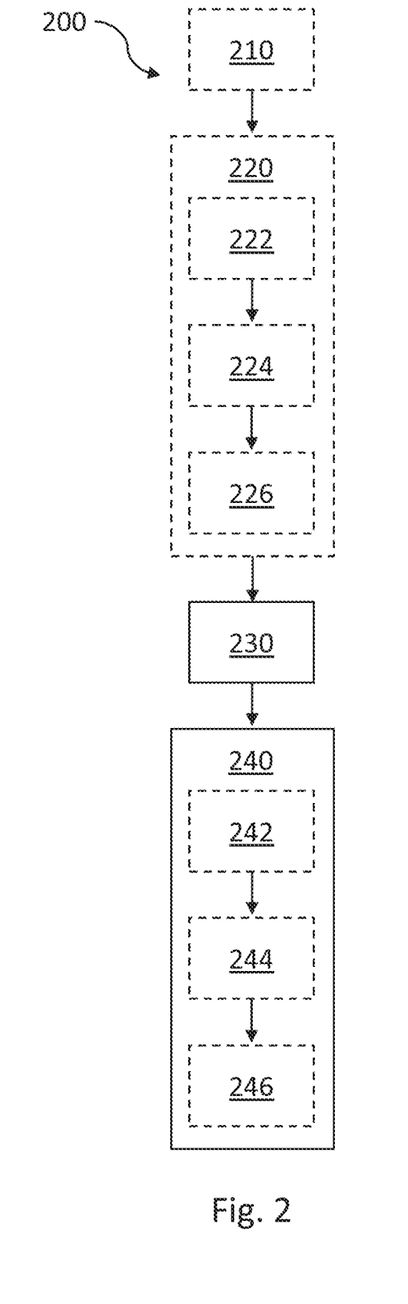
FIG. 2 is a flow diagram showing an example of a method of controlling a landing gear system of an aircraft using a landing gear controller of the aircraft.

FIG. 2 is a flow diagram showing an example of a method of controlling a landing gear system of an aircraft using a landing gear controller of the aircraft. The method 200 comprises: receiving 210 an input indicative of an event (such as any one or more of the examples given above); causing 220 performance of a preliminary portion of a landing gear retraction procedure on the basis of the input; receiving 230 a signal from a position sensor, the signal being indicative of a position of a part of an extendible strut of a landing gear, wherein the landing gear is movable between an extended position and a retracted position, and wherein the receiving occurs when the aircraft, or the landing gear, is in contact with the ground; and automatically causing 240 performance of at least a portion of the landing gear retraction procedure on the basis of the signal.

The method 200 may be performed by the landing gear controller 150 discussed herein or any variant thereof discussed herein. The position sensor may be the position sensor 140 discussed herein or any variant thereof discussed herein. The strut may be the strut 136 discussed herein or any variant thereof discussed herein. The landing gear may be the landing gear 130 discussed herein or any variant thereof discussed herein.

In some examples, the receiving 210 action may be omitted. In some examples, the causing 220 action may be omitted.

In some examples, the preliminary portion of the procedure comprises at least one of: operation 222 of an isolator (such as the isolator 160) to enable power to be supplied to the part of the landing gear system; actuation 224 of one or more landing gear bay door actuators (such as actuator 122) to move a landing gear bay door (such as door 120) further from an open position; and/or unlocking 226 of one or more landing gear bay door locks (such as locks 124) to permit movement of the landing gear bay door to the open position.

In some examples, the portion of the procedure comprises at least one of: actuation 242 of the one or more landing gear bay door actuators to move the landing gear bay door from the closed position towards the open position; actuation 244 of the one or more landing gear actuators to move the landing gear from the extended position towards the retracted position; and/or actuation 246 of the one or more landing gear bay door actuators to move the landing gear bay door from the open position towards the closed position.

Figure 3:
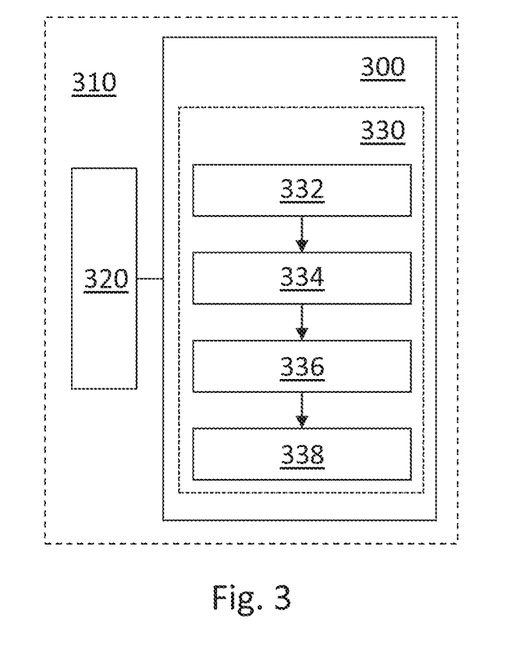
FIG. 3 is a schematic diagram of an example of a non-transitory computer-readable storage medium.

FIG. 3 shows a schematic diagram of a non-transitory computer-readable storage medium 300 according to an example. The non-transitory computer-readable storage medium 300 stores instructions 330 that, if executed by a processor 320 of a controller 310 of an aircraft, cause the processor 320 to perform one of the methods described herein. In some examples, the controller 310 is the landing gear controller 150 described above with reference to FIG. 1 or a variant thereof described herein. The instructions 330 comprise: receiving 332 an input indicative of an event (such as any one or more of the examples given above); causing 334 performance of a preliminary portion of a landing gear retraction procedure on the basis of the input; receiving 336 a signal from a position sensor, the signal being indicative of a position of a part of an extendible strut of a landing gear, wherein the landing gear is movable between an extended position and a retracted position, and wherein the receiving occurs when the aircraft, or the landing gear, is in contact with the ground; and automatically causing 338 performance of at least a portion of the landing gear retraction procedure on the basis of the signal. The instructions 330 may comprise instructions to perform any of the methods 200 described above with reference to FIG. 2.

Figure 4:
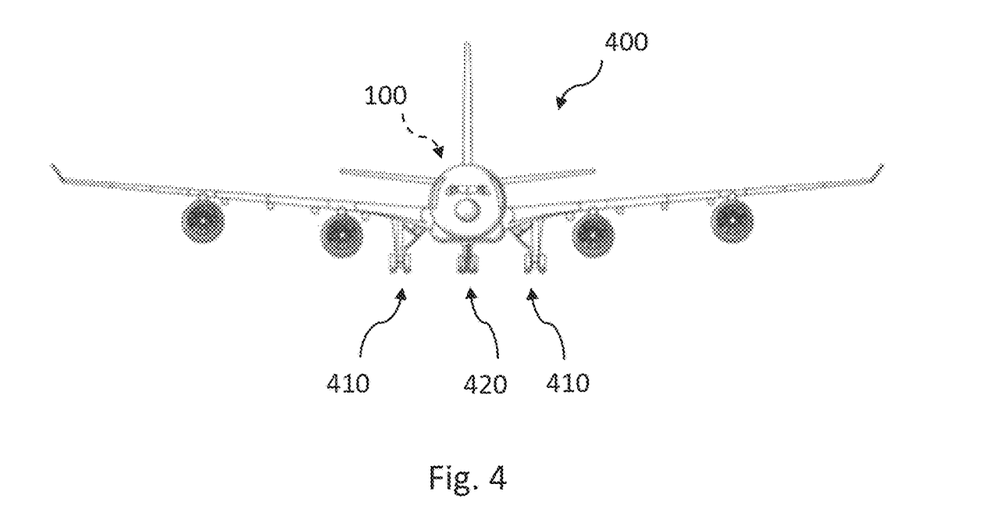
FIG. 4 is a schematic front view of an example of an aircraft.

FIG. 4 is a schematic front view of an aircraft 400. The aircraft 400 comprises two main landing gears 410 and a nose landing gear 420. The aircraft 400 also comprises a landing gear system 100 as discussed herein, such as the system 100 discussed herein with reference to FIG. 1. The landing gear system 100 may be operatively connected to all of the landing gears 410, 420 or just to one or some of the landing gears, such as the main landing gears 410. The aircraft 400 also comprises the non-transitory computer-readable storage medium 300 discussed herein with reference to FIG. 3.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A landing gear system for an aircraft, the landing gear system comprising:
   a landing gear including an extendible strut and the landing gear is movable between an extended position and a retracted position;
   a position sensor configured to detect a position of a part of the extendible strut and output a signal indicative of the position; and
   a landing gear controller communicably connected to the position sensor and configured to:
     receive a signal from the position sensor during a take-off procedure of the aircraft; and,
     on the basis of the signal, determine that the strut has extended and the landing gear is in contact with the ground and automatically cause performance, during the take-off procedure, of at least a portion of a procedure to move the landing gear from the extended position to the retracted position.

2. The landing gear system according to claim 1, wherein the landing gear controller makes the determination that the strut has extended and the landing gear is in contact with the ground and automatically causes the performance, on the basis of a combination of the signal and at least one further criterion.

3. The landing gear system according to claim 2, wherein the at least one further criterion comprises the signal having been received at the landing gear controller for greater than a predetermined time period.

4. The landing gear system according to claim 2, wherein the at least one further criterion comprises a pitch angle of a bogie of the landing gear.

5. The landing gear system according to claim 1, wherein the position sensor is configured to detect the position of the part of the extendible strut when the extendible strut has a predetermined length that is less than a maximum length to which the strut is extendible.

6. The landing gear system according to claim 5, wherein the predetermined length is at least 50% of the maximum length.

7. The landing gear system according to claim 1, wherein the position sensor is configured to detect the position of the part of the extendible strut when the extendible strut has a predetermined length equaling a maximum length to which the strut is extendible.

8. The landing gear system according to claim 1, further comprising one or more landing gear bay door actuators configured to move a landing gear bay door from a closed position towards an open position to permit movement of the landing gear between the extended position and the retracted position;
   wherein the at least a portion of the procedure to move the landing gear includes the one or more landing gear bay door actuators moving the landing gear bay door from the closed position towards the open position.

9. The landing gear system according to claim 1, further comprising one or more landing gear actuators configured to move the landing gear from the extended position towards the retracted position;
   wherein the portion of the procedure to move the landing gear comprises the one or more landing gear actuators moving the landing gear from the extended position towards the retracted position.

10. The landing gear system according to claim 1, wherein the landing gear controller is configured to:
    receive an input indicative of an event; and
    automatically cause performance of a preliminary portion of the procedure based on the input, before causing the performance of the at least a portion of the procedure.

11. The landing gear system according to claim 10, wherein the input is indicative of at least one of: braking force being less than a predetermined braking force, thrust being greater than a predetermined thrust, aircraft ground-speed being greater than a predetermined groundspeed, change in length of the extendible strut, a command from a cockpit flight control, and aircraft geographical position.

12. The landing gear system according to claim 10, wherein the preliminary portion of the procedure comprises one or more avionics processes and/or one or more mechanical processes.

13. The landing gear system according to claim 10, wherein the preliminary portion of the procedure comprises an avionics side change over.

14. The landing gear system according to claim 10, comprising one or more landing gear bay door locks to retain the landing gear bay door in the closed position when the landing gear bay door lock is locked;
    wherein the preliminary portion of the procedure comprises unlocking the, or each, landing gear bay door lock to permit movement of the landing gear bay door to the open position.

15. The landing gear system according to claim 14, wherein the preliminary portion of the procedure comprises actuating one or more landing gear bay door actuators to move the landing gear bay door further from the open position before the unlocking of the, or each, landing gear bay door lock, thereby to facilitate unlocking of the, or each, landing gear bay door lock.

16. The landing gear system according to claim 10, further comprising an isolator for isolating part of the landing gear system from a power supply;

wherein the preliminary portion of the procedure comprises operation of the isolator to enable power to be supplied to the part of the landing gear system.

17. The landing gear system according to claim 1, wherein the strut includes a shock absorber configured to support the aircraft when the aircraft is on the ground, and wherein the part of the extendible strut is a part of the shock absorber.

18. A method of controlling a landing gear system of an aircraft using a landing gear controller of the aircraft, the method comprising the landing gear controller:

receiving a signal from a position sensor while the aircraft is performing a take-off procedure, wherein the signal is indicative of a position of a part of an extendible strut of a landing gear, the landing gear is movable between an extended position and a retracted position, and the receiving of the signal occurs when the aircraft or the landing gear is in contact with the ground; and in response to the signal and during the take-off procedure, automatically causing performance of at least a portion of a procedure for causing movement of the landing gear from the extended position to the retracted position.

19. A landing gear system for an aircraft, the landing gear system comprising:

a retractable landing gear having a shock absorber that is configured to support the aircraft when the aircraft is on the ground;

a sensor configured to directly detect a characteristic of the shock absorber and output an indication of the characteristic; and a landing gear controller that is communicably connected to the sensor and is configured to receive the indication during take-off of the aircraft, and, in response to the indication and while the aircraft is on the ground during the take-off, to automatically cause performance of at least a portion of a procedure for retracting the landing gear.

* * * * *